United States Patent [19]
Adams

[11] Patent Number: 5,911,379
[45] Date of Patent: Jun. 15, 1999

[54] TAPE CARTRIDGE FOR TWO SEPARATE LENGTHS OF RECORDING TAPE

[75] Inventor: George Frederick Adams, Tucson, Ariz.

[73] Assignee: International Business Machines Corporation, Armonk, N.Y.

[21] Appl. No.: 09/080,195

[22] Filed: May 18, 1998

[51] Int. Cl.$^6$ .................................................. G03B 23/02
[52] U.S. Cl. ...................................... 242/346; 242/347.1
[58] Field of Search .................................... 242/342, 343, 242/343.1, 343.2, 344, 345, 345.1, 346, 347, 347.1; 360/132

[56] References Cited

U.S. PATENT DOCUMENTS

| | | | |
|---|---|---|---|
| 3,525,086 | 8/1970 | Lichowsky | 340/174.1 |
| 4,074,876 | 2/1978 | Gourley | 242/336 |
| 4,195,796 | 4/1980 | Osanai | 242/199 |
| 5,253,246 | 10/1993 | Leonhardt et al. | 369/291 |
| 5,284,308 | 2/1994 | Comeaux et al. | 242/199 |
| 5,297,755 | 3/1994 | Felde et al. | 242/199 |
| 5,335,131 | 8/1994 | Sato et al. | 242/347 |
| 5,547,142 | 8/1996 | Cheatham et al. | 242/338.1 |
| 5,618,005 | 4/1997 | Todd et al. | 242/345.1 |

FOREIGN PATENT DOCUMENTS 59193587   11/1984   Japan .

Primary Examiner—Donald P. Walsh
Assistant Examiner—William A. Rivera
Attorney, Agent, or Firm—John H. Holcombe; Robert M. Sullivan

[57] ABSTRACT

Disclosed is a portable tape cartridge for containing two separate lengths of recording tape for providing rapid access to data by a single tape drive. Two access openings on the inboard side (with respect to the tape drive) of the tape cartridge are respectively positioned toward the left or right. Two sets of tape bearings each respectively supports a length of tape at each of the access openings, and each length of tape is wound on two tape spools. The left set of tape bearings and tape spools are positioned with respect to each other identically to the positioning of the right set of tape bearings and tape spools with respect to each other. This allows the cartridge to be translated sidewise by the tape drive for reading and writing on the left or the right length of tape. The two lengths of tape are wound, when not in use in a drive, so as to have substantially equal lengths thereof wound on each of the spools, and so that the tape at the respective set of tape bearings is the approximate midpoint of the length of tape.

8 Claims, 3 Drawing Sheets

TAPE CARTRIDGE FOR TWO SEPARATE LENGTHS OF RECORDING TAPE

TECHNICAL FIELD

This invention relates to cartridges for containing recording tape, and, more particularly, portable cartridges for recording tape that are primarily adapted for use with high speed tape drives.

BACKGROUND OF THE INVENTION

High speed tape drives are typically employed as part of a data processing complex for the accessing of data stored on tape cartridges. A significant amount of time is typically required to access and load a tape cartridge in a drive. Thus, cartridge magazines and automated data storage libraries are often employed to supply the cartridges to the tape drives.

As the result, there is a continuing desire to reduce the number of cartridges required for the same amount of data. This may be accomplished by increasing the amount of data which may be stored in each of the tape cartridges.

The amount of data stored in each tape cartridge may be increased by increasing the length of tape by reducing its thickness and/or increasing the track density and the linear data density of data stored on the tape. The tape head in the tape drive may have to be altered to handle the thinner tape, and has to be altered in each instance of a change in data density in order to handle the increased number of tracks and the increased linear data density.

However, it would be advantageous to maintain the same cartridge housing, or utilize a cartridge having similar dimensions, so that the same automated data storage libraries, the same magazines, and the same storage shelves and storage slots may continue to be utilized.

Another important measure of the performance of a tape drive is the time to data. However, as the amount of data stored in each tape cartridge is increased, the speed of accessing that increased data by the tape drive is often not similarly increased. If the length of the recording tape is increased, the speed of accessing that data may decrease as the time required by the tape drive to wind the tape spools increases to move the desired data to the tape head, thereby increasing the time required to gain access to data on the longer tape.

SUMMARY OF THE INVENTION

It is an object of the present invention to increase the speed of accessing data stored on recording tape in a tape cartridge.

Disclosed is a portable tape cartridge for containing two separate lengths of recording tape, having two access openings on the inboard side (with respect to the tape drive) of the tape cartridge and in substantially the same plane, one of the access openings closer to the right side and the other of the access openings closer to the left side. Four tape spools, all having parallel axes of rotation, are positioned within the housing, which is generally rectangular, so the axes form four corners of a quadrilateral. Four drive hubs are positioned at the spools. Two sets of tape bearings are provided, each set supporting one of the lengths of recording tape at an access opening. The left set of tape bearings and tape spools are positioned with respect to each other identically to the positioning of the right set of tape bearings and tape spools with respect to each other. Each of the two separate lengths of recording tape is wound on the inboard and outboard spools at the same side of the housing, and extends across the tape bearings at the access opening closer to the same side of the housing as the spools. This allows the cartridge to be translated sidewise by the tape drive for reading and writing on the left or the right length of tape.

The two lengths of tape are wound, when not in use in a drive, so as to have approximately equal lengths thereof wound on each of the spools, and so that the tape at the respective set of tape bearings is substantially the midpoint of the length of tape, thereby further increasing the speed of accessing the data.

For a fuller understanding of the present invention, reference should be made to the following detailed description taken in conjunction with the accompanying drawings.

DETAILED DESCRIPTION OF THE INVENTION

Figure 1:
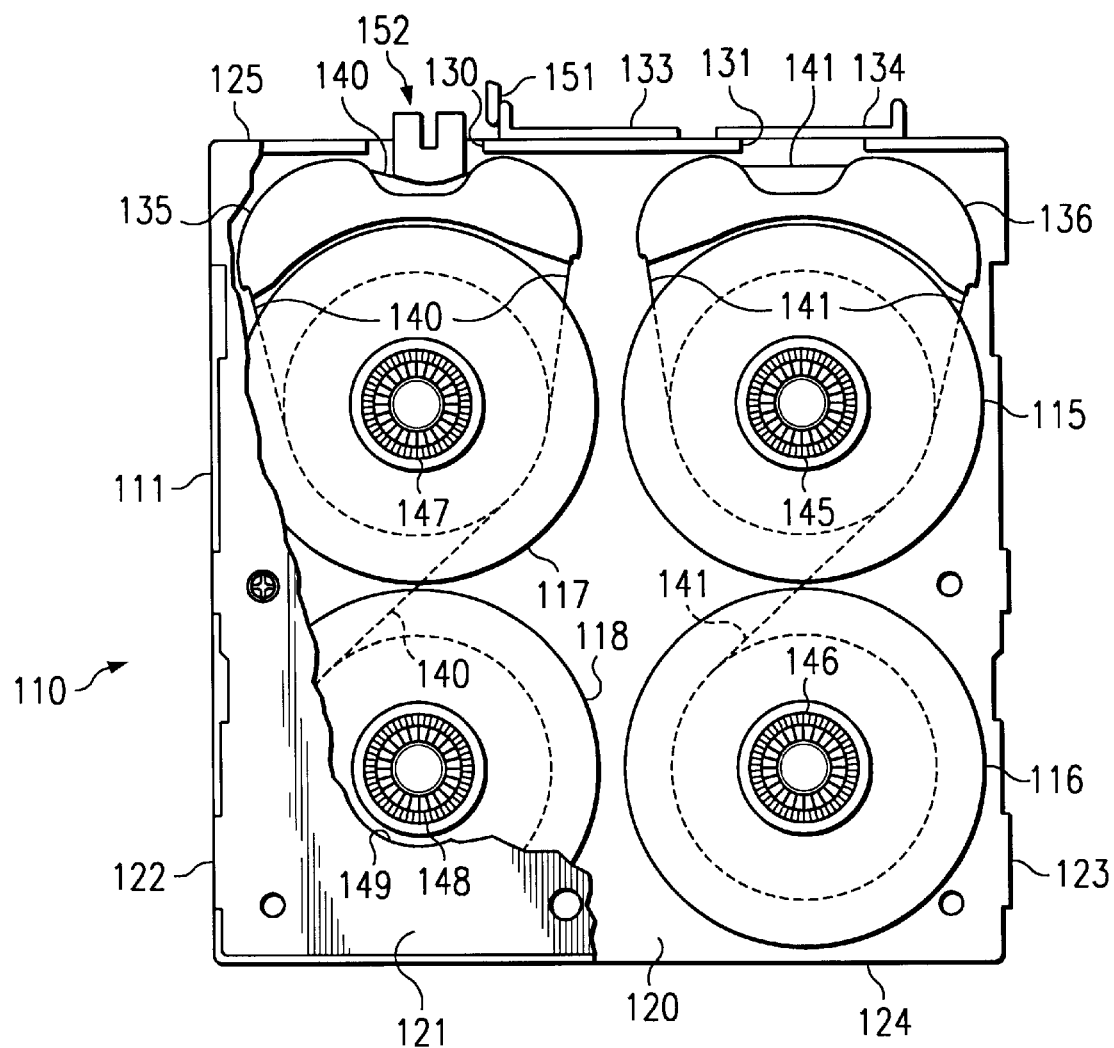
FIG. 1 is a partially cutaway plan view of an embodiment of a portable tape cartridge of the present invention.

Recording tape provides a high volumetric density data storage media at a low cost per media unit. However, throughput and time to data are relatively slow. The IBM 3590 Data Storage Cartridge format is one of the foremost data storage media formats employed for storage of data. The format comprises a single reel generally rectangular cartridge with a leader block at one corner. The single length of magnetic recording tape is wound on the single reel and attached to the leader block. The tape must therefore always be wound from the leader block end onto a spool in the tape drive in order to access data on the recording tape. Thus, the average access time to existing data is the time required to wind the tape from the leader block end to the midpoint of the data, and the average access time to record new data is the time required to wind the tape from the leader block end to the end of the existing data.

FIGS. 1, 2A, 2B and 2C illustrate an embodiment of the present invention wherein a cartridge 110, having a housing 111 of generally rectangular shape and having external dimensions generally conforming to those of an existing 3590 Data Storage Cartridge, is provided with four tape spools 115–118, all having parallel axes of rotation. In accordance with the present invention, the use of external dimensions (length, width and height) for the housing 111 which generally conform to those of the existing 3590 Data Storage Cartridge facilitates use of the cartridge 110 in the same automated data storage libraries that employ the existing 3590 Data Storage Cartridge format, and facilitates use in the same magazines, and the same storage shelves and storage slots, and replacing only the tape drives.

The generally rectangular housing 111 has a top side 120, a bottom side 121, a left side 122, a right side 123, an outboard side 124, and an inboard side 125. The inboard side 125 has two access openings 130 and 131 spaced apart in the longitudinal direction. Access opening 131 is closer to the right side 123 and access opening 130 is closer to the left side 122. Each of the access openings 130 and 131 may be protected by an openable door 133 and 134, respectively. In the illustrated embodiment, the doors 133 and 134 slide towards the center to open. The doors 133 and 134 are in the same plane, which is substantially parallel to the inboard side 125 of the housing 111.

The tape spools 115–118 are positioned within the generally rectangular housing 111 so that their axes form four corners of a quadrilateral. Thus, the corners of the rectangle comprise, respectively, a left inboard corner (spool 117), a left outboard corner (spool 118), a right inboard corner (spool 115), and a right outboard corner (spool 116).

Two sets of tape bearings 135 and 136 are provided, each positioned at one of the access openings 130 and 131, respectively, and between the tape spools and the access opening. Each of the sets of tape bearing supports a length of recording tape 140 and 141, respectively, at the respective access opening.

The length of recording tape 140 extends from inboard tape spool 117 to the set of tape bearings 135 and back past the tape spool 117, and in close proximity to or in contact with the same length of tape as wound on the inboard tape spool, then to the outboard tape spool 118. Similarly, the length of recording tape 141 extends from inboard tape spool 115 to the set of tape bearings 136 and back past the tape spool 115, and in close proximity to or in contact with the same length of tape as wound on the inboard tape spool, then to the outboard tape spool 116. Coming into close proximity to or in contact with the same length of tape inhibits the transmission of vibrations from the tape spools to the tape bearings.

Four drive hubs 145–148 are each positioned at the bottom end of the parallel axes of one of the spools and adjacent a corresponding hub opening 149 in the bottom side 121 of the housing 111. The drive hubs 147 and 148 at the spool axes at the left side of the quadrilateral are positioned with respect to each other and with respect to the left side set of tape bearings 135 and access opening 130 identically to the positioning of the drive hubs 145 and 146 at the spool axes at the right side of the quadrilateral with respect to each other and with respect to the right side set of tape bearings 134 and access opening 131.

The identical positioning of the drive hubs and the respective set of tape bearings and having the doors 133 and 134 in the same plane and parallel to the inboard side 125 of the housing 111, allows the cartridge 110 to be easily translated from side to side in a tape drive 38 and operated by the tape drive to read and/or write on one or the other of the lengths of recording tape 140 or 141.

Figure 2A:
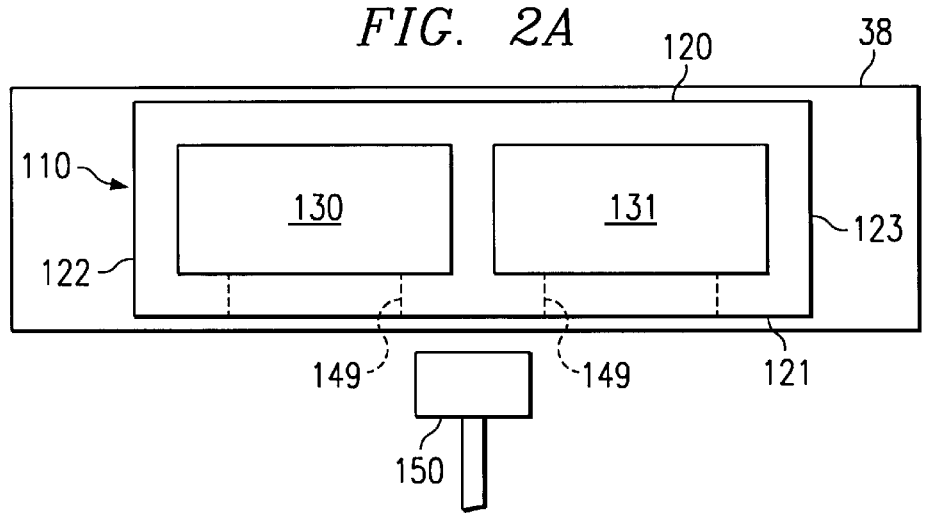
FIGS. 2A, 2B and 2C are diagrammatic representations of the portable tape cartridge of FIG. 1 at various positions in a tape drive load mechanism.
Figure 2B:
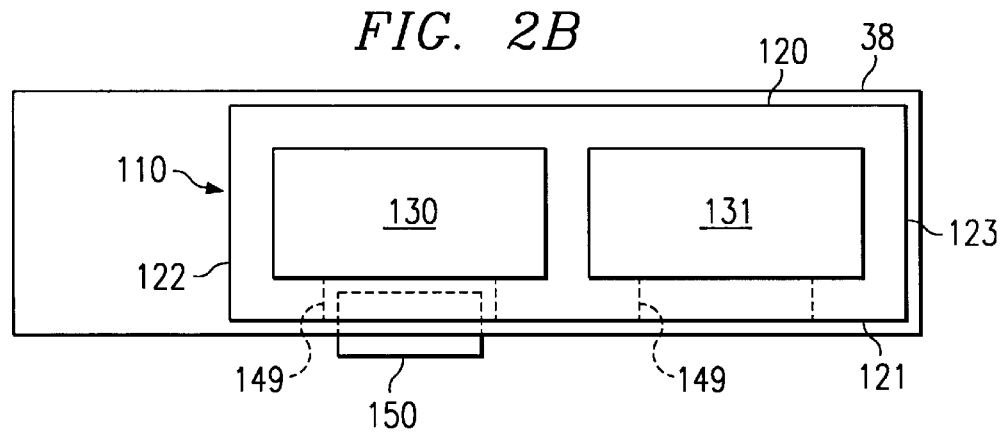

Thus, when inserted in the tape drive 38, as illustrated in FIG. 2A, the cartridge 110 may be positioned toward the center of the tape drive. Depending on which length of tape is to be accessed, the tape drive 38 translates the cartridge 110 to one side of the drive, e.g., as illustrated in FIG. 2B, a door actuator 151 slides one of the doors open, e.g., door 133, and the drive clutch 150 engages the hubs through the opening 149 on the side of the cartridge 110 for the length of tape 140 exposed at the open door. A tape head 152 of the tape drive then engages the tape as it is supported at the access opening by the set of tape bearings, and the tape drive will rotate the hubs to move the recording tape past the tape head 152 to read and/or write data on the recording tape.

Figure 2C:
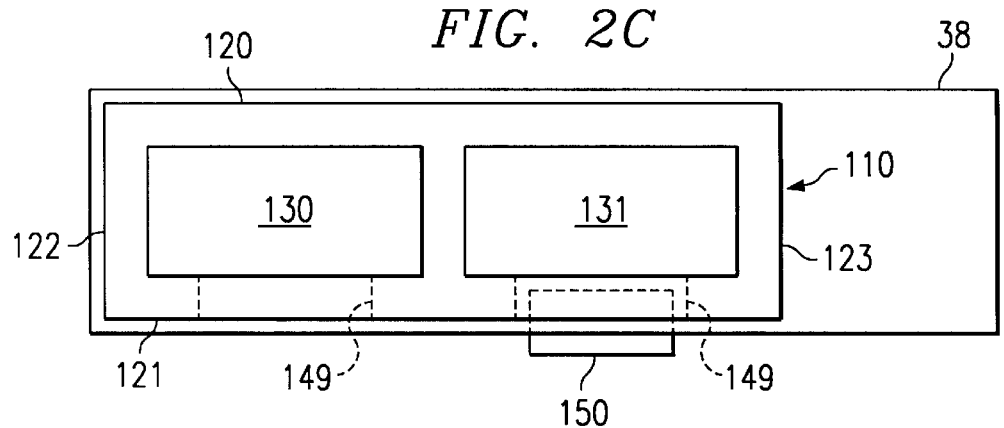

To access the other length of tape, the tape drive 38 shifts the cartridge 110 towards the opposite side of the tape drive, for example, as illustrated in FIG. 2C. To access tape 141, door 134 is opened, the drive clutch 150 engages the hubs for the tape 141 and the tape head 152 is inserted into access opening 131. The tape drive then rotates the hubs for spools 115 and 116. Thus, the same tape head 151 and the same hub drive mechanism may be utilized for both lengths of recording tape.

Alternatively, the cartridge 110 may be directly positioned at the side of the tape drive required for accessing the desired length of tape, and the tape drive 38 will not translate the cartridge for one of the lengths of tape, but if the other length of tape is to be accessed, will then translate the cartridge to the other side of the drive.

By having four tape spools and two lengths of tape, either of the lengths of tape may be accessed, thereby speeding the time to data since less of the recording tape must be moved on average before the desired data is reached. In accordance with the present invention, the time to data is further improved by winding the lengths of tape, when not in use in a drive, so as to have substantially equal lengths thereof wound on each of the spools, so that the tape at the respective sets of tape bearings is substantially the approximate midpoint of the length of tape.

As described above, the use of external dimensions (length, width and height) for the housing 111 which generally conform to those of the existing 3590 Data Storage Cartridge facilitates use of the cartridge 110 in the same automated data storage libraries that employs the existing 3590 Data Storage Cartridge format.

Figure 3:
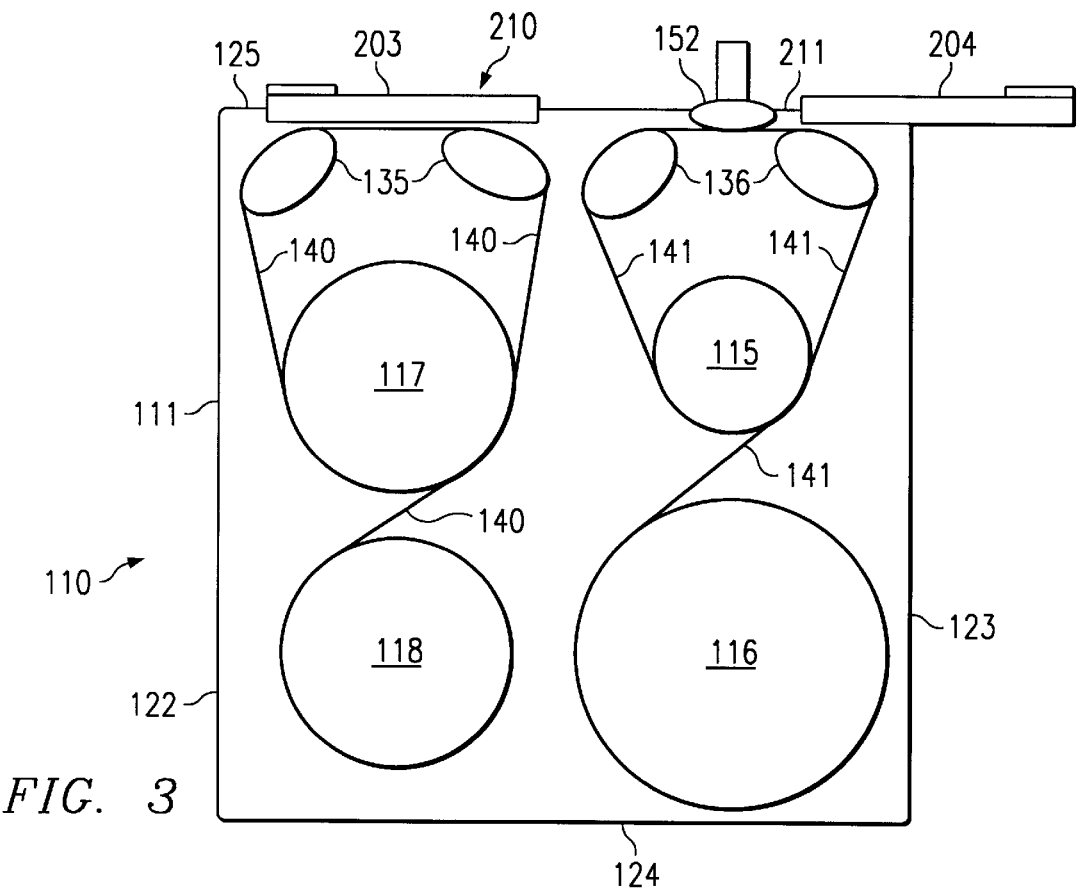
FIG. 3 is a diagrammatic representation of an alternative embodiment of a portable tape cartridge of the present invention.

An alternative embodiment of the invention is illustrated in FIG. 3, having doors 203 and 204 at access openings 210 and 211 which slide away from the center to open. Doors 203 and 204 are in the same plane and parallel to the inboard side 125 of housing 111 to facilitate translation of the cartridge to the left or the right to access the separate lengths of tape 140 and 141.

In the embodiment of FIG. 3, the length of tape 140 is illustrated as currently not in use in a drive, having approximately equal lengths thereof wound on each of the spools 117 and 118, and so that the tape at the respective sets of tape bearings is the approximate midpoint of the length of tape, further improving the time to data.

Figure 4:
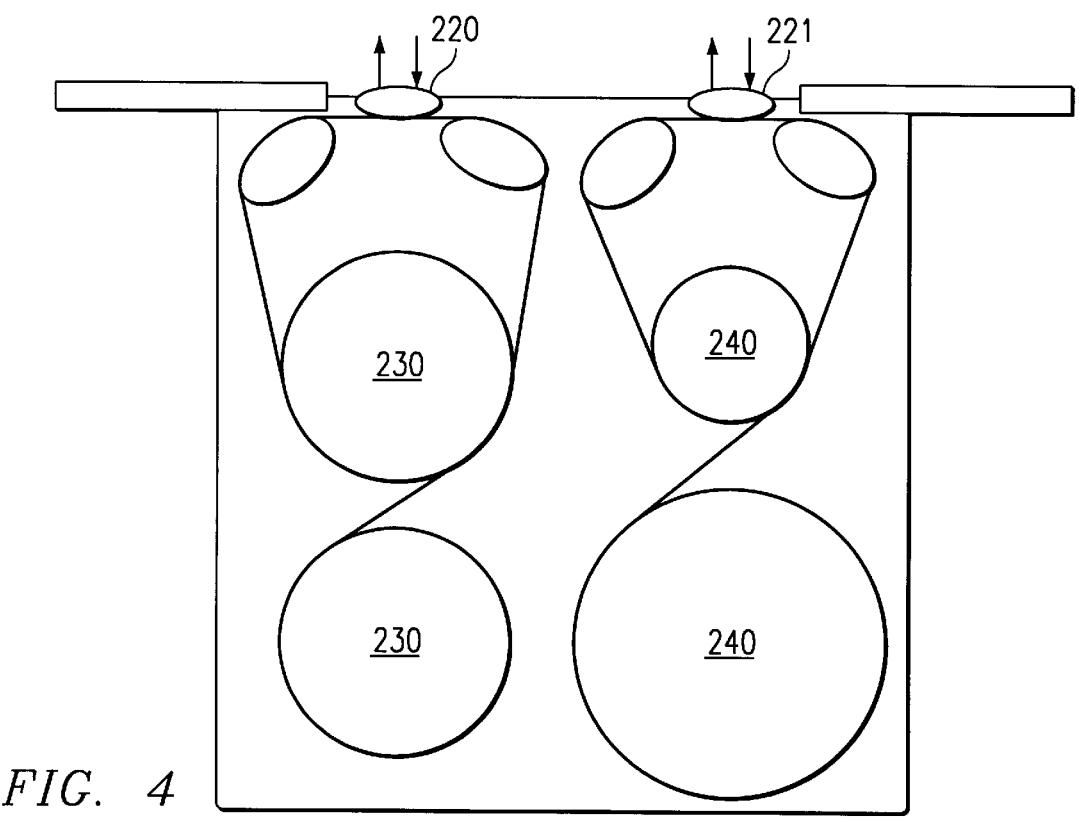
FIG. 4 is a diagrammatic representation of two tape heads employed with the portable tape cartridge of FIG. 3.

Further, as illustrated in FIG. 4, separate tape heads 220 and 221 and spool drive mechanisms 230 and 240 may be provided to access either length of tape without shifting, or to access both lengths of tape simultaneously.

While the preferred embodiments of the present invention have been illustrated in detail, it should be apparent that modifications and adaptations to those embodiments may occur to one skilled in the art without departing from the scope of the present invention as set forth in the following claims.

I claim:

1. A portable tape cartridge for containing two separate lengths of recording tape, comprising:

a generally rectangular housing having a top side, a bottom side, a left side, a right side, an outboard side, and an inboard side, said housing inboard side having two access openings in substantially the same plane, spaced apart in the longitudinal direction, one of said access openings closer to said left side and the other of said access openings closer to said right side, said housing bottom side having four hub openings therein;

four tape spools, all having parallel axes of rotation, said tape spools positioned within said generally rectangular housing so said axes form four corners of a quadrilateral, said corners comprising, respectively, a left inboard corner, a left outboard corner, a right inboard corner, and a right outboard corner;

two sets of tape bearings, in said generally rectangular housing, each said set of tape bearings positioned between said tape spools and said access opening, each said set of tape bearings for supporting one of said lengths of recording tape at said access opening;

four drive hubs, each positioned at the bottom end of one of said parallel axes and adjacent one of said hub openings in said housing, said drive hubs positioned at said axes at the left side of said quadrilateral with respect to said set of tape bearings at said left side access opening identically to the positioning of said drive hubs at said axes at the right side of said quadrilateral with respect to said set of tape bearings at said right side access opening; and a tape path for each of said two separate lengths of recording tape wound on the respective inboard and outboard ones of said tape spools positioned on the same side of said quadrilateral, and extending between said respective inboard tape spool to and across said set of tape bearings positioned at said access opening closest to said respective inboard tape spool, said tape paths extending from said respective set of tape bearings to said respective outboard tape spool.

2. The portable tape cartridge of claim 1, additionally comprising a sliding door at each of said access openings, said sliding doors each sliding in the same plane between a closed position covering the respective one of said access openings, and an open position, said sliding door plane substantially parallel to said plane of said access openings.

3. The portable tape cartridge of claim 1, wherein said two tape paths additionally comprise winding said two separate lengths of recording tape, when not in use in a drive, so as to have substantially equal lengths thereof wound on each of said spools, and so that said recording tape at said respective set of tape bearings is substantially the midpoint of said length of recording tape.

4. The portable tape cartridge of claim 1, wherein said generally rectangular housing additionally comprises external dimensions generally conforming to the external dimensions for 3590 magnetic tape cartridges.

5. A portable tape cartridge, comprising:

a first length of recording tape;

a second length of recording tape;

a generally rectangular housing having a top side, a bottom side, a left side, a right side, an outboard side, and an inboard side, said housing inboard side having two access openings in substantially the same plane, spaced apart in the longitudinal direction, one of said access openings closer to said left side and the other of said access openings closer to said right side, said housing bottom side having four hub openings therein;

four tape spools, all having parallel axes of rotation, said tape spools positioned within said generally rectangular housing so said axes form four corners of a quadrilateral, said corners comprising, respectively, a left inboard corner, a left outboard corner, a right inboard corner, and a right outboard corner;

two sets of tape bearings, each said set of tape bearings positioned at one of said access openings in said generally rectangular housing, each said set of tape bearings positioned between said tape spools and said access opening, each said set of tape bearings supporting one of said lengths of recording tape at said access opening;

four drive hubs, each positioned at the bottom end of one of said parallel axes and adjacent one of said hub openings in said housing, said drive hubs positioned at said axes at the left side of said quadrilateral with respect to said set of tape bearings at said left side access opening identically to the positioning of said drive hubs at said axes at the right side of said quadrilateral with respect to said set of tape bearings at said right side access opening; and respectively, each of said first and second lengths of recording tape wound on the respective inboard and outboard ones of said tape spools positioned on the same side of said quadrilateral, and extending between said respective inboard tape spool to and across said set of tape bearings positioned at said access opening closest to said respective inboard tape spool, said lengths of recording tape extending from said respective set of tape bearings to said respective outboard tape spool.

6. The portable tape cartridge of claim 5, additionally comprising a sliding door at each of said access openings, said sliding doors each sliding in the same plane between a closed position covering the respective one of said access openings, and an open position, said sliding door plane substantially parallel to said plane of said access openings.

7. The portable tape cartridge of claim 5, wherein said first and said second lengths of tape are wound, when not in use in a drive, so as to have substantially equal lengths thereof wound on each of said respective inboard and outboard spools, and so that said recording tape at said respective set of tape bearings is substantially the midpoint of said length of recording tape.

8. Dual paths for respective first and second lengths of recording tape in a housing, said housing having a left side, a right side, and outboard side, and an inboard side, said dual paths comprising:

four tape spools, all having parallel axes of rotation, said tape spools positioned within said housing so said axes form four corners of a quadrilateral, said corners comprising, respectively, a left inboard corner, a left outboard corner, a right inboard corner, and a right outboard corner, said tape spools each adapted for rotation at one end of said axes, said tape spools at the left side of said quadrilateral positioned with respect to each other identically to the positioning of said tape spools at the right side of said quadrilateral with respect to each other;

two sets of tape bearings, each said set of tape bearings positioned at an inboard corner side of said housing, respectively closer to said left and to said right side of said housing, each said set of tape bearings for supporting one of said first and second lengths of recording tape, said left side set of tape bearings positioned with respect to said tape spools at the left side of said quadrilateral identically to the positioning of said right side set of tape bearings with respect to said tape spools at the right side of said quadrilateral; and said tape paths for each of said first and second lengths of recording tape extending from a respective left or right one of said inboard tape spools to a respective tape bearing closest to, respectively, said left or right inboard tape spool, across said set of tape bearings, to a respective left or right one of said outboard tape spools.

\* \* \* \* \*